United States Patent [19]

Ohira et al.

[11] Patent Number: 5,138,701

[45] Date of Patent: Aug. 11, 1992

[54] DATA COMMUNICATION CONTROL SYSTEM

[75] Inventors: Tadashi Ohira; Syuzi Maruta; Kazuhiro Araki, all of Osaka, Japan

[73] Assignee: Minolta Camera Kabushiki Kaisha, Osaka, Japan

[21] Appl. No.: 667,360

[22] Filed: Mar. 11, 1991

Related U.S. Application Data

[63] Continuation of Ser. No. 378,294, Jul. 11, 1989, abandoned.

[30] Foreign Application Priority Data

Jul. 12, 1988 [JP] Japan .................. 63-173567
Jul. 12, 1988 [JP] Japan .................. 63-173568

[51] Int. Cl.$^5$ .................................. G06F 13/10
[52] U.S. Cl. ........................ 395/200; 395/575; 364/DIG. 1; 364/226; 364/230.4; 364/241; 364/266.5; 364/268.9
[58] Field of Search ... 364/200 MS File, 900 MS File, 364/131, 132; 370/85; 340/825.06

[56] References Cited

U.S. PATENT DOCUMENTS

| | | | |
|---|---|---|---|
| 4,523,299 | 6/1985 | Donohue et al. | 364/200 |
| 4,556,310 | 12/1985 | Masuda | 355/14 R |
| 4,740,887 | 4/1988 | Rutenberg | 364/200 |
| 4,750,115 | 6/1988 | Sekiya et al. | 364/200 |
| 4,847,756 | 7/1989 | Ito et al. | 364/200 |
| 4,851,994 | 7/1989 | Toda et al. | 364/900 |
| 4,937,777 | 6/1990 | Flood et al. | 364/900 |

FOREIGN PATENT DOCUMENTS

| | | |
|---|---|---|
| 61-103297 | 5/1986 | Japan . |
| 61-103298 | 5/1986 | Japan . |
| 61-103299 | 5/1986 | Japan . |
| 61-103345 | 5/1986 | Japan . |
| 0171073 | 12/1986 | United Kingdom . |

Primary Examiner—Thomas M. Heckler
Assistant Examiner—John Loomis
Attorney, Agent, or Firm—Burns, Doane, Swecker & Mathis

[57] ABSTRACT

A data communication control system for an apparatus which may be selectively equipped with two or more functional modules each having predetermined functions, the control system having a plurality of subsidiary control units respectively in control of the functional modules, a main control unit operative to communicate with each of the subsidiary control units and a data transmission network interconnecting the main control unit and each of the subsidiary control units to allow full-duplex communication therebetween, each subsidiary control unit being operative to generate mode data designating any of the functions assigned to the particular subsidiary control unit and transmit the mode data to the main control unit, wherein, when mode data designating any function is generated by one of the subsidiary control units and is sent to the main control unit, the main control unit transmits to each subsidiary control unit data designating the function designated by the mode data if the main control unit determines that the execution of the particular function is allowable, or the function designated by the mode data received prior to the currently received mode data if the main control unit determines that the execution of the function designated by the currently received mode data is not allowable.

7 Claims, 11 Drawing Sheets

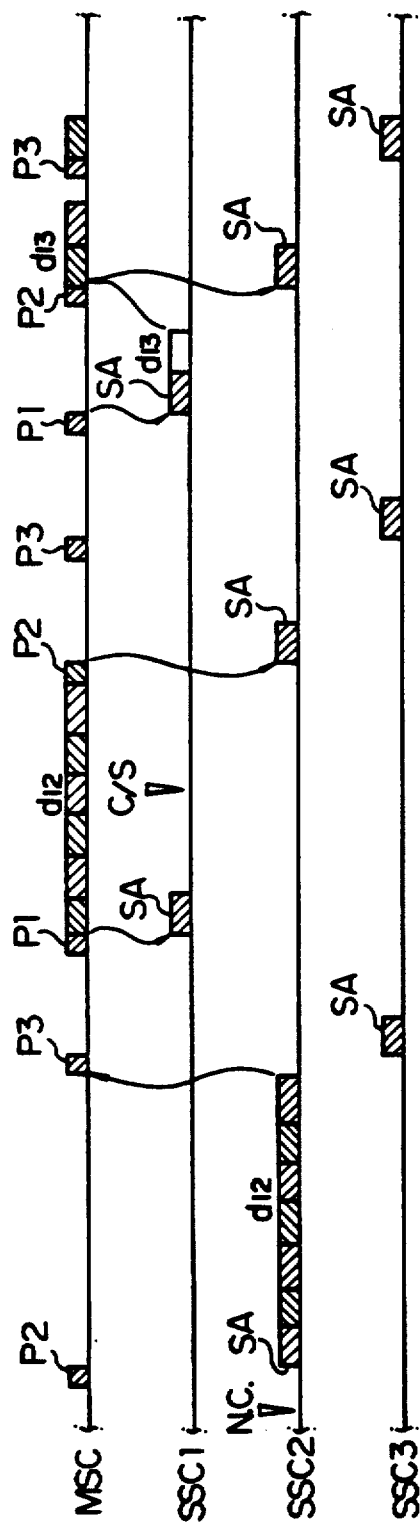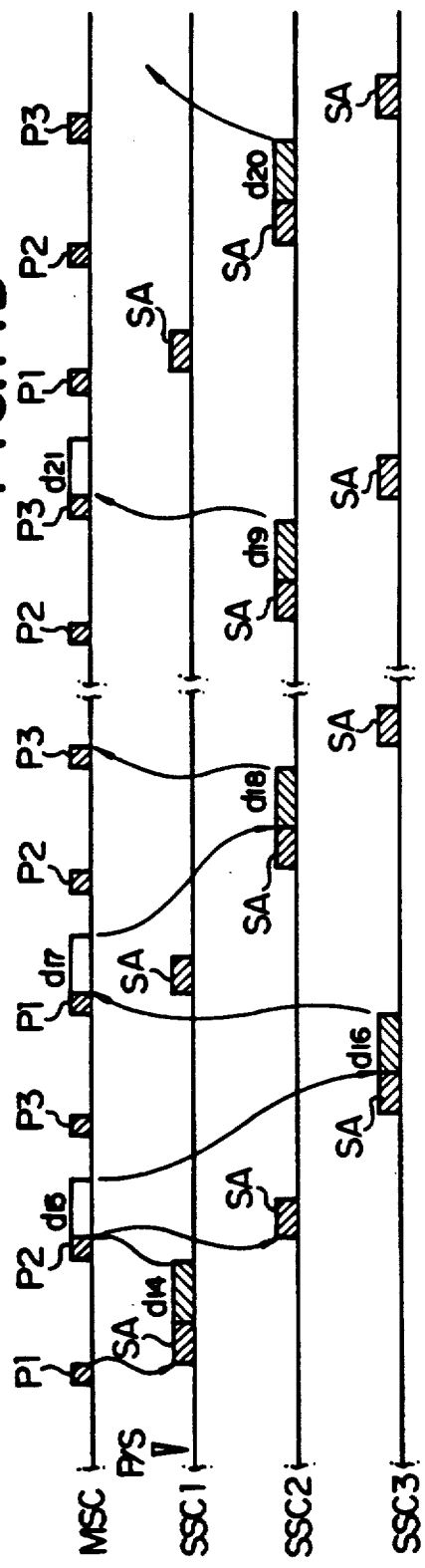

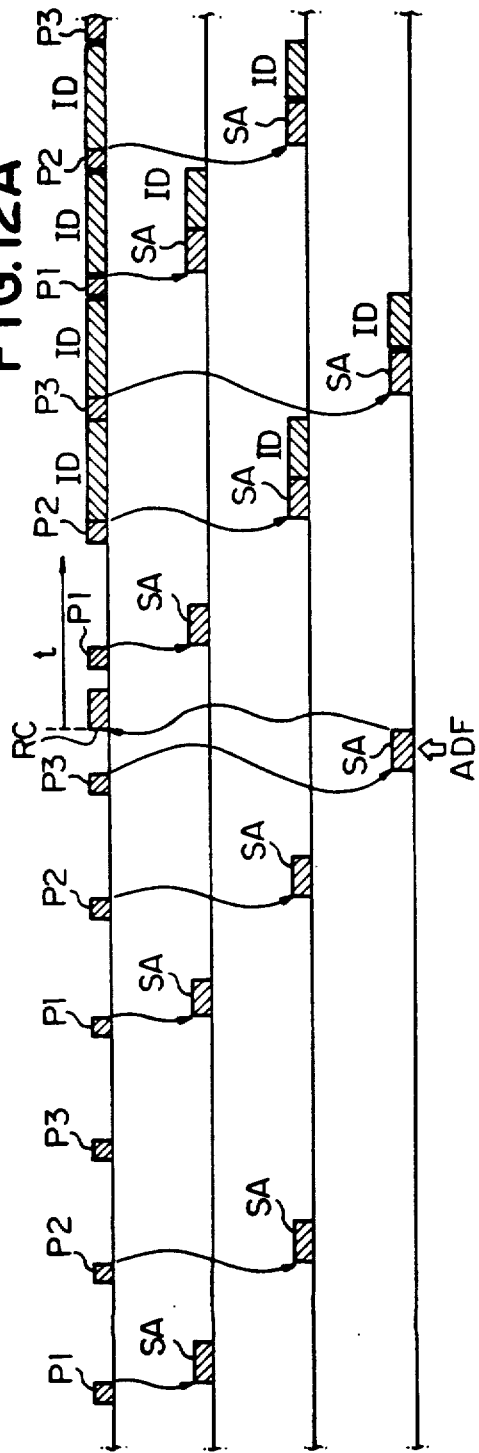
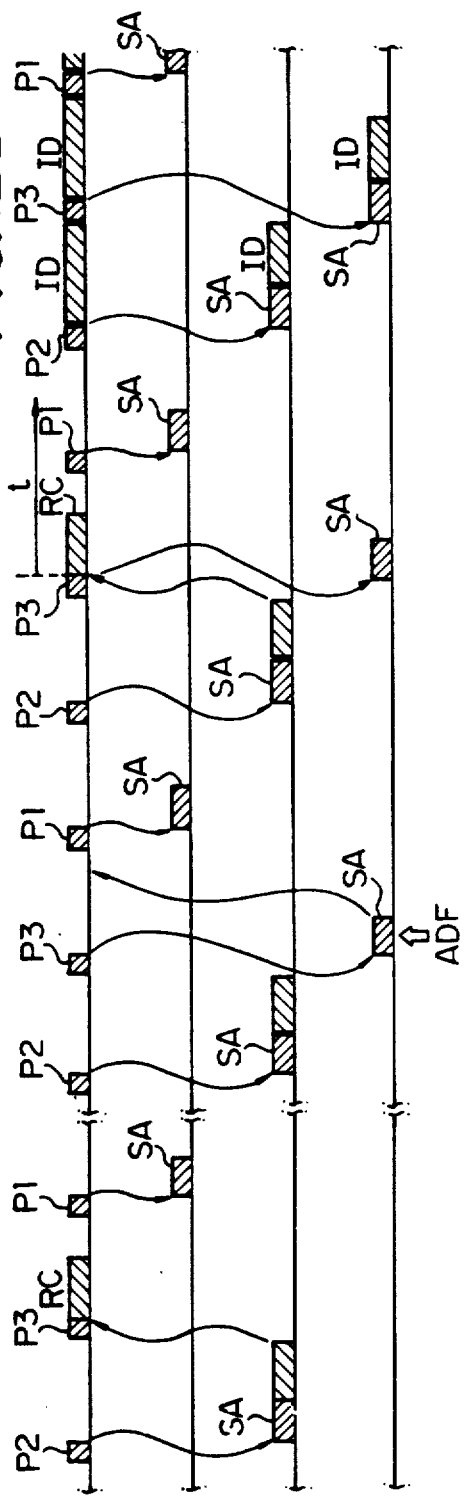

DATA COMMUNICATION CONTROL SYSTEM

This application is a continuation of application Ser. No. 378,294, filed Jul. 11, 1989, now abandoned.

FIELD OF THE INVENTION

The present invention relates in general to a data communication control system and, particularly, to a data communication control system of the type having a plurality of functional modules each of which is adapted to achieve functions proper to the particular module. Typical of an apparatus of this type is an image forming apparatus, examples of which include a digital copier, an electrophotographic image duplicating machine and any type of printer apparatus.

BACKGROUND OF THE INVENTION

An electrophotographic image duplicating machine, for example, has functional modules including a control panel and an automatic document feed module in addition to an image reproducing module for the reproduction of duplicate images. Each of the functional modules operates under the control of a subsidiary system control unit exclusively associated with the particular functional module. The respective subsidiary system control units associated with the individual functional modules in turn are under the control of a single main system control unit which is operative not only to control each of the subsidiary system control units but to coordinate the operation to be performed by two or more of the functional modules.

For exchange of data between the main system control unit and each of the subsidiary system control units in this type of image forming apparatus, there may be used a data communication network of either the leased transmission line type or the common interface bus type in a data communication control system for the image forming apparatus. In a data communication control system using a data communication network of the leased transmission line type, each of the subsidiary system control units is electrically coupled to the main system control unit through transmission lines proper to the particular subsidiary system control unit so that each of the subsidiary system control units is permitted to communicate with the main system control unit independently of the other subsidiary system control units. A data communication network of this type however has a drawback encountered when an additional functional module is to be coupled to the apparatus at the user's option. To enable the main system control unit to be in control of the additional functional module, additional data transmission lines for the additional functional module must be provided and connected to the main system control unit.

A drawback of this nature is eliminated in a data communication control system using a full-duplex communication network of the common interface bus type in which the respective subsidiary system control units are coupled to the main system control unit through an interface bus common to the individual subsidiary system control units. A particular address is assigned to each of the plurality of subsidiary system control units so that the individual subsidiary system control units are one after another accessed by the main system control unit with the addresses for the subsidiary system control units designated successively. A known example of a data communication network of this common interface bus type is taught in Japanese Provisional Patent Publication (Kokai) No. 59-127133.

In an apparatus having a plurality of functional modules including those which may be selectively added to the apparatus at the user's option, it sometimes happens that any one of the modules is not assembled to the apparatus and is thus unavailable. It may further happen that the functional module which has thus been unavailable is installed into the apparatus in addition to the existing functional modules after the apparatus is put to use or during operation of the apparatus. If this happens in an apparatus including a data communication network of the common interface bus type, it is required that the subsidiary system control unit in control of the functional module newly added to the apparatus be coupled in both hardware and software to the main system control unit of the system. An object of the present invention is to realize such a function in a data communication control system using a full-duplex communication network of the common interface bus type.

Each of the main and subsidiary control units of a data communication control system of the described character is typically implemented by a semiconductor microprocessor. Where the control system is incorporated in an image forming apparatus having, for example, a control panel, an image reproducing module and an automatic document feed module, the interface between each of these functional modules and the data communication control system is dictated by the microprocessor forming part of the main system control unit. Where the image forming apparatus is equipped with an increased number of functional modules, the microprocessor of the main system control unit must bear an increased amount of burden to be completely predominant over the operation of the individual functional modules. Another object of the present invention is to provide a useful solution to this problem.

SUMMARY OF THE INVENTION

In accordance with one outstanding aspect of the present invention, there is provided a data communication control system for an apparatus which may be selectively equipped with at least two functional modules each having predetermined functions exclusively assigned to the module, the data communication control system comprising a) a plurality of subsidiary control means in control of the functional modules, respectively, b) main control means operative to communicate with each of the subsidiary control means, and c) coupling means connecting the main control means and each of the subsidiary control means together to allow full-duplex communication between the main control means and each of the plurality of subsidiary control means, d) each of the plurality of subsidiary control means being operative to generate mode data designating any of the functions assigned to the particular subsidiary control means and transmit the mode data to the main control means through the coupling means, e) wherein, when a mode data designating any function is generated by any one of the subsidiary control means and is transmitted to the main control means through the coupling means, the main control means responsive to the mode data is operative to transmit to each of the plurality of subsidiary control means data designating 1) the function designated by the mode data received by the main control means if the main control means determines that the execution of the particular function is allowable, or 2) the function designated by the prior mode data received by the main control means from any one of the plurality of subsidiary control means prior to the currently received mode data if the main control means determines that the execution of the function designated by the currently received mode data is not allowable.

In accordance with another outstanding aspect of the present invention, there is provided a data communication control system for an apparatus which may be selectively equipped with at least two functional modules each having predetermined functions exclusively assigned to the module, the data communication control system comprising a) a plurality of subsidiary control means in control of the functional modules, respectively, each of the plurality of subsidiary control means storing therein software programs which dictate the functions assigned to the functional module under the control of the subsidiary control means, b) main control means operative to communicate with each of the subsidiary control means and confirm whether or not each of the functional modules is provided in the apparatus, and c) coupling means connecting the main control means and each of the subsidiary control means together to allow full-duplex communication between the main control means and each of the plurality of subsidiary control means, d) wherein, when the apparatus is not equipped with any one of the functional modules, the main control means (1) confirms that the particular whether or not each of the functional modules is unavailable and (2) thereafter no longer communicates with the subsidiary control means in control of the unavailable functional module, and when the functional module once determined to be unavailable is added to the apparatus, (3) confirms that the functional module is now available, (4) begins to communicate with the subsidiary control means in control of the particular functional module, and (5) instruct each of the plurality of subsidiary control means to initialize the software programs stored therein.

BRIEF DESCRIPTION OF THE DRAWINGS

The features and advantages of a data communication control system according to the present invention will be more clearly appreciated from the following description taken in conjunction with the accompanying drawings in which:

FIGS. 11A, 11B, 11C and 11D are timecharts showing the flows of data between the main system control unit and each of the subsidiary system control units in the data communication control system embodying the present invention under predetermined conditions of the apparatus illustrated in FIG. 1; and FIGS. 12A and 12B are timecharts showing the flows of data between the main system control unit and each of the subsidiary system control units in the data communication control system embodying the present invention under other predetermined conditions of the apparatus illustrated in FIG. 1.

DESCRIPTION OF THE PREFERRED EMBODIMENTS

While a data communication control system according to the present invention may be used in an apparatus of any type having two or more functional modules as in a digital copier, an electrophotographic image duplicating apparatus or a printer apparatus, a preferred embodiment of the present invention will be hereinafter described as being applied to a data communication control system for use in an electrophotographic image duplicating machine.

General Construction and Arrangement of Apparatus

Figure 1:
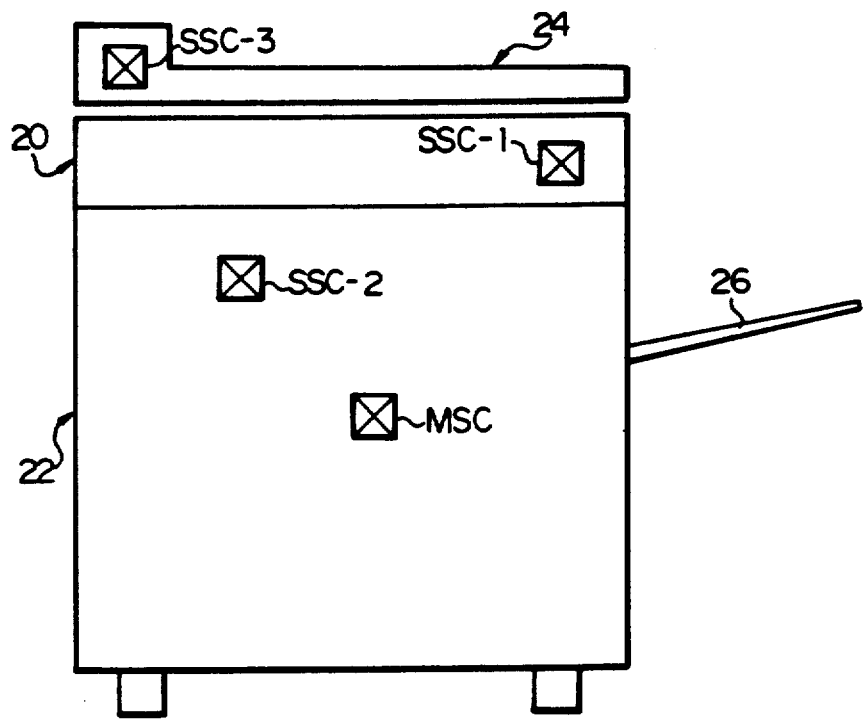
FIG. 1 is a front elevation view schematically showing a typical example of the general construction and arrangement of an image duplicating apparatus into which a data communication control system embodying the present invention may be incorporated.

FIG. 1 shows the general construction and arrangement of a typical example of an electrophotographic image duplicating apparatus to which the present invention is applied. The image duplicating apparatus largely comprises a control panel 20, an image reproducing module 22, and an automatic document feed module 24. As well known in the art, the control panel 20 has a variety of keys, indicators and display sections thereon. The construction and arrangement of such a control panel 20 per se is well known in the art and will not be herein described. The image reproducing module 22 is adapted to optically scan a document loaded into the apparatus and reproduce visible images on a print sheet from the original images on the document optically scanned. The automatic document feed module 24 is incorporated into the apparatus ordinarily at the user's option and is used to automatically feed a document sheet or document sheets one after another to a predetermined position to be optically scanned by the reproducing module 22. The construction and arrangement of each of the control panel 20, the image reproducing module 22 and the automatic document feed module 24 per se is well known in the art and will not be herein described. The apparatus further comprises a print sheet discharge tray 26 to which a print sheet having visible toner images applied thereto is to be discharged from the image reproducing module 22.

As further illustrated schematically in FIG. 1, the data communication control system embodying the present invention comprises a main system control unit MSC and a plurality of subsidiary system control units including first, second and third subsidiary system control units SSC-1, SSC-2 and SSC-3. The first subsidiary system control unit SSC-1 is particularly associated with and in control of the control panel 20 and processes the various signals to be received from and supplied to the control panel 20. The second subsidiary system control unit SSC-2 is particularly associated with and in control of the image reproducing module 22 and processes the various signals to be received from and supplied to the image reproducing module 22. The third subsidiary system control unit SSC-3 is associated with and in control of the operation of the automatic document feed module 24. These first, second and third subsidiary system control units SSC-1, SSC-2 and SSC-3 are capable of communicating with the main system control unit MSC independently of one another and control the operations of the respectively associated functional modules 20, 22 and 24 under the supervision of the main system control unit MSC.

General Circuit Arrangement of Control System

Figure 2:
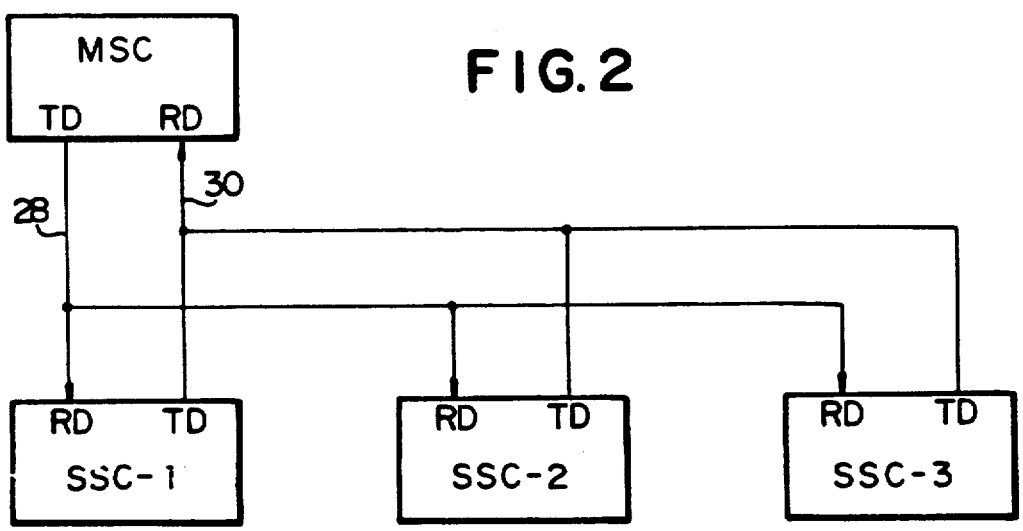
FIG. 2 is a block diagram showing the general circuit arrangement of a data communication control system embodying the present invention.

In the data communication control system embodying the present invention is used a full-duplex data communication network of the previously mentioned common interface bus type. FIG. 2 shows the general circuit arrangement of a data communication control system using such a full-duplex data communication network of the previously mentioned common interface bus type. It is herein noted that each of the main system control unit MSC and subsidiary system control units SSC-1, SSC-2 and SSC-3 of the data communication control system comprises a semiconductor microprocessor, a random-access memory (RAM) providing logic address storage spaces to be managed by the microprocessor, and a read-only memory (ROM) having fixedly stored therein the various routine and subroutine programs to be executed by the microprocessor.

The main system control unit MSC has a data output port TD connected through a serial data transmission line 28 to a data input port RD of each of the first, second and third subsidiary system control units SSC-1, SSC-2 and SSC-3. The microprocessor of the main system control unit MSC further has a data input port TR connected through a serial data transmission line 30 to a data output port TD of the microprocessor forming part of each of the first, second and third subsidiary system control units SSC-1, SSC-2 and SSC-3. Each of the main and subsidiary system control units is further connected a random-access memory (RAM) and a read-only memory (ROM). The random-access memory (hereinafter referred to simply as memory) provides logic address spaces to be managed by the microprocessor. The read-only memory has fixedly stored therein the various routine and subroutine programs to be executed by the microprocessor.

In a full-duplex data communication network of the common interface bus type, two or more subsidiary system control units could not concurrently access the data input port RD of the main system control unit MSC and are allowed to transmit data to the main system control unit MSC at controlled timings. In the control system embodying the present invention, the times at which the individual subsidiary system control units SSC-1, SSC-2 and SSC-3 are allowed to access the data input port RD of the main system control unit MSC are controlled in a polling mode of communication. An example of the polling mode of communication realized in a full-duplex data communication network of the common interface bus type is taught in Japanese Provisional Patent Publication (Kokai) No. 59-127133.

In the polling mode of data communication, a master station herein implemented by the main system control unit MSC cyclically sends inquiries to individual terminal or slave stations herein implemented by the first, second and third subsidiary system control units SSC-1, SSC-2 and SSC-3 to check if any of the slave stations currently has data to be transmitted to the master station. On the other hand, when the master station has any data to be sent to one or each of the slave stations, the master station inquires of the slave station or each of the slave stations if the slave station is prepared to receive the data. Depending on the answer to the inquiry thus sent from the main system control unit MSC to one or each of the subsidiary system control units SSC-1, SSC-2 and SSC-3 or vice versa, data is transmitted from the former to the latter or from the latter to the former.

In the polling mode of communication used in the data communication control system embodying the present invention, the main system control unit MSC further has a function to detect whether or not each of the functional modules under the control of the individual subsidiary system control units SSC-1, SSC-2 and SSC-33, respectively, is assembled to the apparatus. In other words, the main system control unit MSC determines if each of the control panel 20, image reproducing module 22 and automatic document feed module 24 is in actuality available in the image forming apparatus illustrated in FIG. 1. To enable the main system control unit MSC to make such a decision, each of the subsidiary system control units SSC-1, SSC-2 and SSC-33 submits answer data to the main system control unit MSC when the subsidiary system control unit is in receipt of data (hereinafter referred to as data transmission grant data) granting the transmission of data from the subsidiary system control unit to the main system control unit MSC. On receipt of such answer data from one of the functional units, the main system control unit MSC determines that the particular functional module is in actuality available in the apparatus and continues communication with the subsidiary system control module. In the absence of answer data from any one of the subsidiary system control units SSC-1, SSC-2 and SSC-3, the main system control unit MSC determines that the particular functional module is not available in the apparatus and no longer communicates with the subsidiary system control unit until it is thereafter confirmed that the functional unit determined to be unavailable is newly added to the apparatus.

Figure 3:
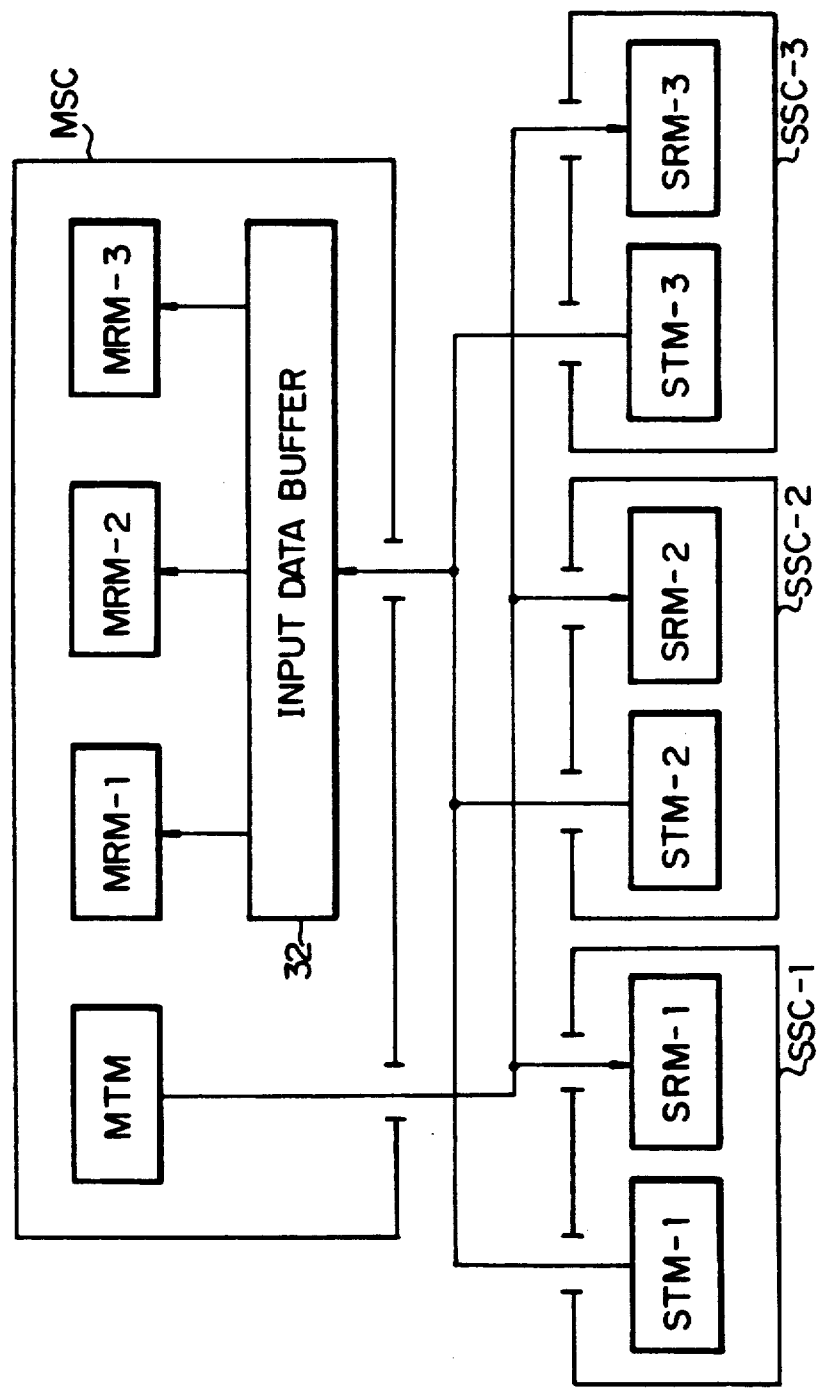
FIG. 3 is a plan view showing the general configuration of the transmission and received data storage maps incorporated in the individual control units provided in the data communication control system illustrated in FIG. 2.

FIG. 3 is a plan view showing the general configuration of the transmission and received data storage maps in the memory incorporated in the individual control units provided in the data communication control system illustrated in FIG. 2.

The main system control unit MSC has a single transmission data storage map MTM and a plurality of received data storage maps respectively associated with the subsidiary system control units include first, second and third received data storage maps MRM-1, MRM-2 and MRM-3 associated with the first, second and third subsidiary system control units SSC-1, SSC-2 and SSC-3, respectively. Between the received data storage maps MRM-1, MRM-2 and MRM-3 and the subsidiary system control units SSC-1, SSC-2 and SSC-3 is provided an input data buffer 32 which forms part of the main system control unit MSC per se. This input data buffer 32 is adapted to temporarily latch therein data supplied from each of the first, second and third subsidiary system control units SSC-1, SSC-2 and SSC-3 to each of the received data storage maps MRM-1, MRM-2 and MRM-3.

On the other hand, the first, second and third subsidiary system control units SSC-1, SSC-2 and SSC-3 have transmission data storage maps STM-1, STM-2 and STM-3 and received data storage maps SRM-1, SRM-2 and SRM-3. The transmission data storage maps STM-1, STM-2 and STM-3 are provided in association with the received data storage maps MRM-1, MRM-2 and MRM-3, respectively, of the main system control unit MSC through the input data buffer 32, while the received data storage maps SRM-1, SRM-2 and SRM-3 are provided commonly in association with the single transmission data storage map MTM of the main system control unit MSC.

When the main system control unit MSC sends data from the transmission data storage map MTM to any of the subsidiary system control units SSC-1, SSC-2 and SSC-3, the subsidiary system control unit in receipt of the data stores the data into the received data storage map SRM-1, SRM-2 or SRM-3 thereof. Furthermore, the main system control unit MSC may send to each of the received data storage maps SRM-1, SRM-2 and SRM-3 of the subsidiary system control units SSC-1, SSC-2 and SSC-3 data representative of the current status of the system as a whole to enable the individual subsidiary system control units SSC-1, SSC-2 and SSC-3 to operate on the basis of common information.

The individual subsidiary system control units SSC-1, SSC-2 and SSC-3 successively receive data transmission grant data from the main system control unit MSC and, when each of the subsidiary system control units is in receipt of the data, the subsidiary system control unit fetches data from the transmission data storage map STM-1, STM-2 or STM-3 of the subsidiary system control unit and sends the responding data to the main system control unit MSC. the received data storage maps MRM-1, MRM-2 and MRM-3 in the main system control unit MSC. The main system control unit MSC in receipt of the responding data thus supplied from each of the subsidiary system control units SSC-1, SSC-2 and SSC-3 temporarily stores the received data into the input data buffer 32 and thereafter loads the data into each of the received data storage maps MRM-1, MRM-2 and MRM-3 thereof.

Figure 4:
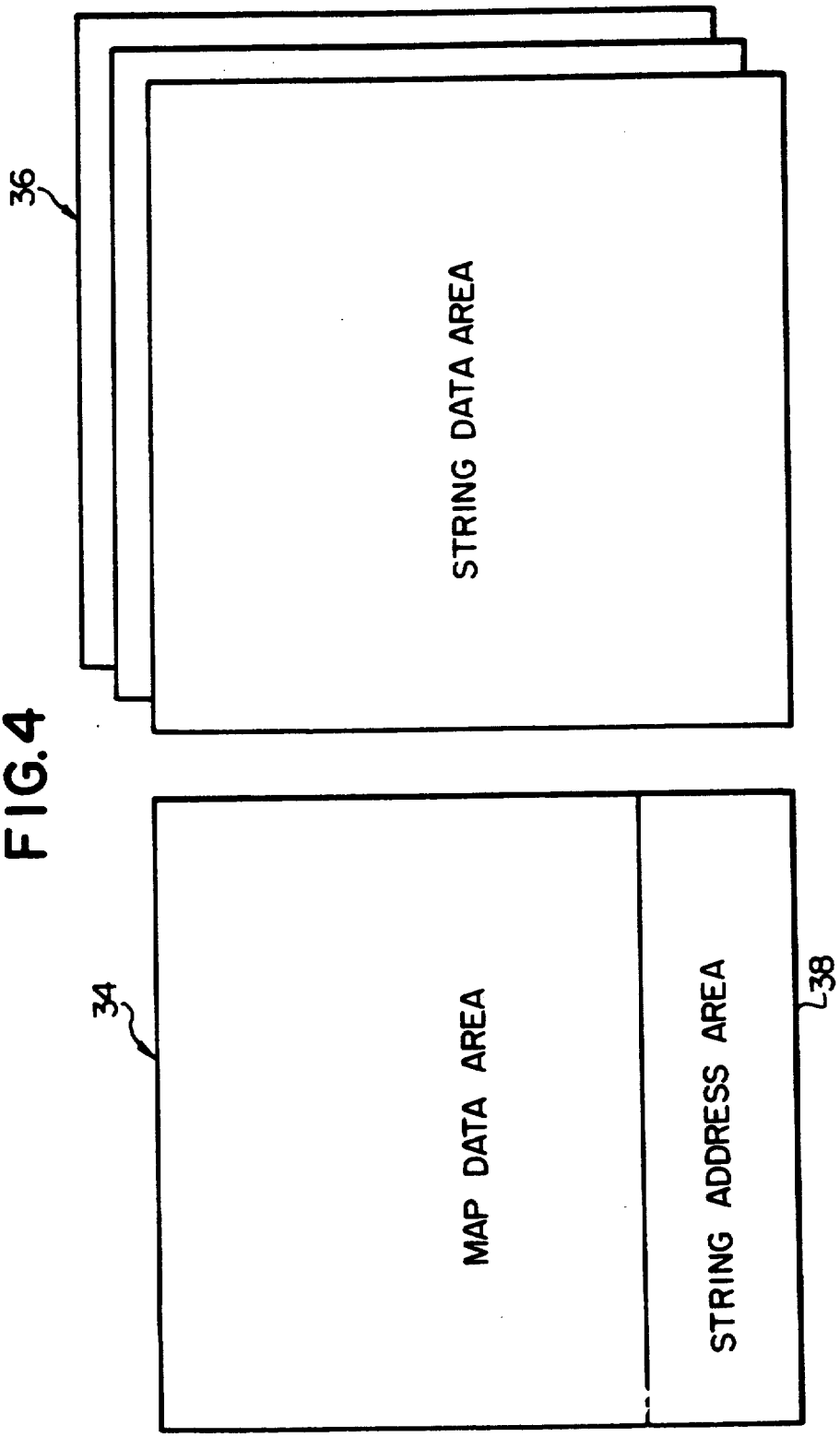
FIG. 4 is a plan view showing the general arrangement of the memory areas provided in each of the transmission and received data storage maps illustrated in FIG. 3.

Each of the transmission data storage map MTM and received data storage maps MRM-1, MRM-2 and MRM-3 of the main system control unit MSC and the transmission data storage maps STM-1, STM-2 and STM-3 and received data storage maps SRM-1, SRM-2 and SRM-3 of the subsidiary system control units SSC-1, SSC-2 and SSC-3 has memory areas arranged as shown in FIG. 4. As illustrated herein, each of the transmission and received data storage maps of the main and subsidiary system control units consists of a map data storage area 34 and a string data storage area 36 composed of a plurality of sections. The map data area 34 is used to store data of ordinary lengths while the string data area 36 is used for the storage of data having greater data lengths. Data of the former type will be hereinafter referred to as map data and data of the latter type referred to as string data.

Data is transmitted between the main system control unit MSC and each of the subsidiary system control units SSC-1, SSC-2 and SSC-3 with address information added to the data. The main system control unit MSC or the subsidiary system control unit is of the map data type or of the string type. The data determined to be of the map data type is stored into the map data storage area 34 and the data determined to be of the string type data is stored into the string data storage area 36 of the received data storage map. The address information received together with data of the string data type is stored into a string address storage area 38 provided in the map data storage area 34.

Description will be hereinafter made in regard to the operation of the data communication control system embodying the present invention including the main system control unit MSC and subsidiary system control units SSC-1, SSC-2 and SSC-3 arranged as hereinbefore described.

Main Routine Program for MSC

Figure 5:
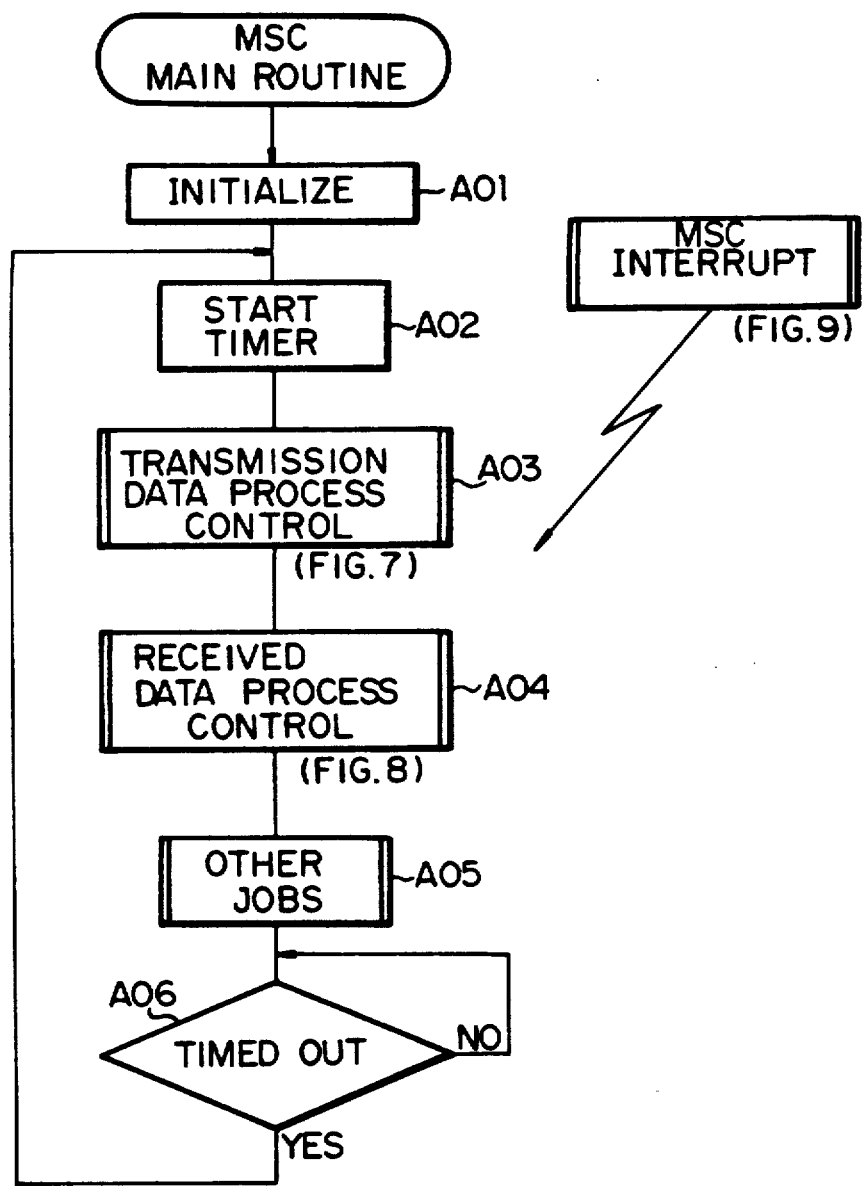
FIG. 5 is a flowchart showing a main routine program to be executed by a microprocessor forming part of a main system control unit included in the data communication control system illustrated in FIG. 2.

FIG. 5 shows the main routine program to be executed by the main system control unit MSC. The routine program starts to run with the image forming apparatus switched in and first initializes the microprocessor and the associated memory of the main system control unit MSC so that all the conditions and modes of operation to be controlled by means of the main system control unit MSC are selected in accordance with prescribed "default" rules. An internal timer is then initiated into operation at step A02 to count a predetermined time interval allowed for a single complete iteration of the routine program.

The main system control unit MSC then executes a transmission data process control subroutine program A03 through which the microprocessor stores into the transmission data storage map MTM thereof data to be transmitted to any of the subsidiary system control units SSC-1, SSC-2 and SSC-3. The details of this transmission data process control subroutine program A03 will be hereinafter described with reference to FIG. 7. The main system control unit MSC then proceeds to a received data process control subroutine program A04 to examine the data which the main system control unit MSC may have received from any of the subsidiary system control units SSC-1, SSC-2 and SSC-3. If it is found that there is data received from the subsidiary system control unit SSC-1, SSC-2 or SSC-3, the main system control unit MSC stores the data into the received data storage map MRM-1, MRM-2 or MRM-3, respectively, of the unit. The details of this received data process control subroutine program A04 will be hereinafter described with reference to FIG. 8.

Subsequently to the received data process control subroutine program A04, the main system control unit MSC executes a subroutine program A05 to process various data signals supplied from the subsidiary system control units SSC-1, SSC-2 and SSC-3 while generating data which dictate the operation of the subsidiary system control units SSC-1, SSC-2 and SSC-3. When it is thereafter confirmed at step A06 that the predetermined time interval which has been set at step A02 has lapsed, the main system control unit MSC reverts to the step A02 and recycles the subroutine programs A02 to A06.

For the transmission of data from the main system control unit MSC to any of the subsidiary system control units SSC-1, SSC-2 and SSC-3, the data which the control unit MSC as the intending data transmitter is about to transmit to the intended destination is first stored into the transmission data storage map MTM of the memory in the transmitter control unit MSC. Then, the transmitter control unit MSC interrupts the operation currently in progress in the intended destination control unit SSC-1, SSC-2 or SSC3. The destination control unit SSC-1, SSC-2 or SSC3 thus interrupted fetches data from the transmission data storage map STM-1, STM-2 or STM-3 of the memory in the destination control unit and transmits the responding data to the transmitter control unit MSC which now acts as a data receiver control unit. The data receiver control unit MSC in receipt of the data stores the data into its data storage map MRM-1, MRM-2 or MRM-3 associated with the subsidiary system control unit SSC-1, SSC-2 or SSC-3 in which the received data originated.

In the presence of a request for interrupt from any of the subsidiary system control units SSC-1, SSC-2 and SSC-3 to the microprocessor of the main system control unit MSC, there is generated an "MSC" interrupt. The "MSC" interrupt is generated on transmission of the request for interrupt from the data output port TD of the subsidiary system control unit SSC-1, SSC-2 or SSC-3 to the data input port RD of the main system control unit MSC through the serial data transmission line 30.

When there is a request for "MSC" interrupt, the microprocessor included in the main system control unit MSC requested to interrupt its operation temporarily brings an end to the operation currently in progress and executes an "MSC" interrupt routine program. The details of the "MSC" interrupt routine program will be hereinafter described with reference to FIG. 9. As a microprocessor capable of executing the "MSC" interrupt is operable the product muPD7810HG of NEC Corporation.

Main Routine Program for SSC

Figure 6:
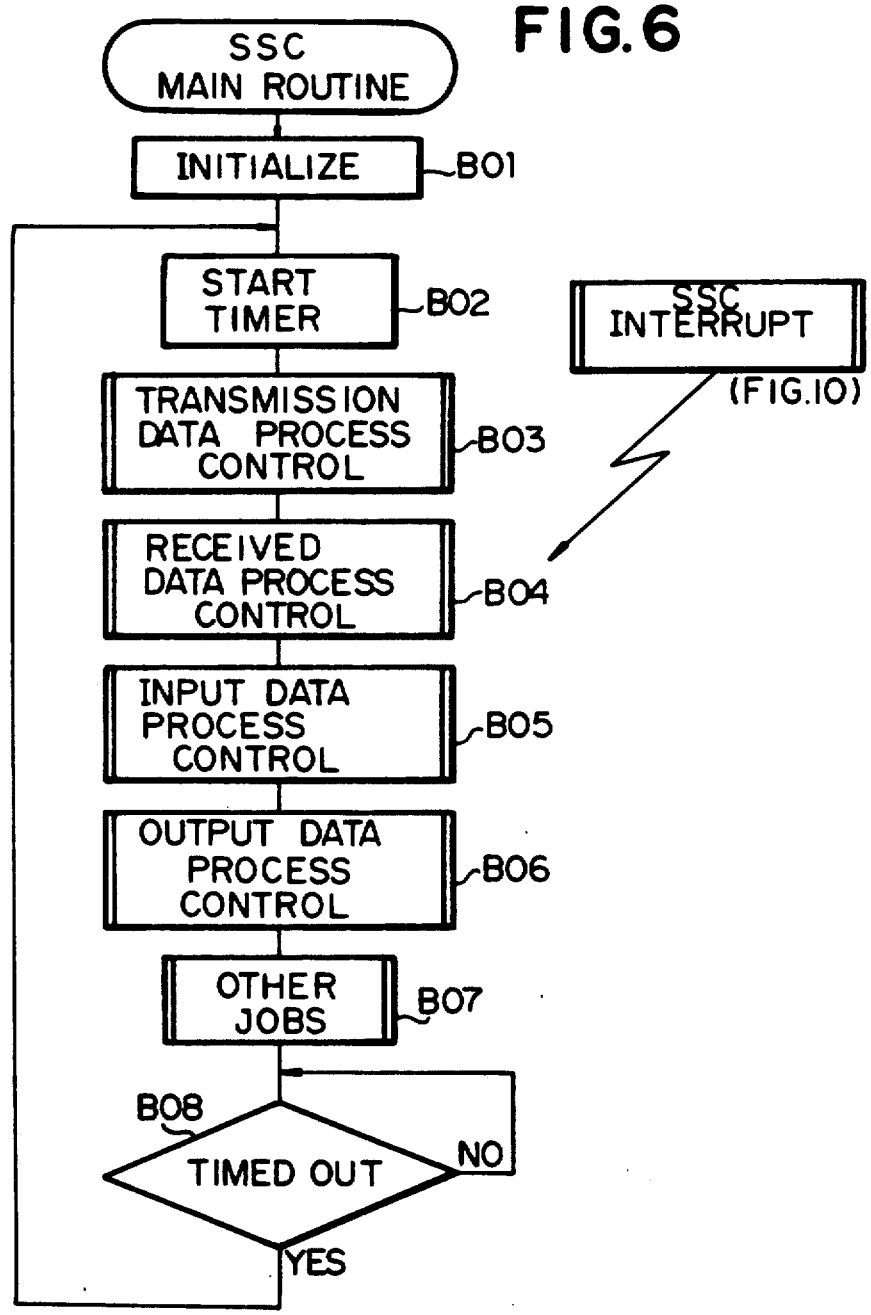
FIG. 6 is a flowchart showing a main routine program to be executed by a microprocessor forming part of a subsidiary system control unit included in the data communication control system illustrated in FIG. 4.

FIG. 6 shows the main routine program to be executed by the microprocessor included in each of the subsidiary system control units SSC-1, SSC-2 and SSC-3 (each of which will be hereinafter referred to as SSC). The routine program herein shown also starts to run simultaneously with the main routine program for the main system control unit MSC and first initializes the microprocessor and the associated memory of the subsidiary system control unit SSC so that all the conditions and modes of operation to be controlled by means of the subsidiary system control unit are selected in accordance with prescribed "default" rules. An internal timer is then initiated into operation at step B02 to count a predetermined time interval allowed for a single complete iteration of the routine program.

The subsidiary system control unit SSC then executs a transmission data process control subroutine program B03 through which the microprocessor stores into the transmission data storage map transmission data storage map STM-1, STM-2 or STM-3 thereof data to be transmitted to the main system control unit MSC. The subsidiary system control unit SSC then proceeds to a received data process control subroutine program B04 to examine the data which the subsidiary system control unit may have received from the main system control unit MSC. If it is found that there is data received from the main system control unit MSC, the subsidiary system control unit SSC stores the data into the received data storage map SRM-1, SRM-2 or SRM-3, respectively, thereof.

Upon termination of the received data process control subroutine program B04, the subsidiary system control unit SSC executes an input data process control subroutine program B05 through which subsidiary system control unit SSC processes various pieces of data received from the functional module under the control of the subsidiary system control unit. These various pieces of data may be the data generated through manipulation of the keys provided on the image control panel 20 under the control of the first subsidiary system control unit SSC-1. If necessary, these pieces of data are loaded into the associated memory for relay to the main system control unit MSC.

The input data process control subroutine program B05 is followed by an output data process control subroutine program B06 through which the subsidiary system control unit SSC processes various pieces of data which are to be output to the functional module under the control of the subsidiary system control unit. These pieces of data may be the data to be used for activation of the display and indicator elements included in the control panel 20 under the control of the first subsidiary system control unit SSC-1. The details of the transmission and received data process control subroutine programs B03 and B04 and the input and output data process control subroutine programs B05 and B06 are rather immaterial to the understanding of the subject matter of the present invention and as such will not be herein described.

Subsequently to the output data process control subroutine program B06, the subsidiary system control unit SSC may execute a subroutine program B07 to process various data signals supplied from the main system control unit MSC. When it is thereafter confirmed at step B08 that the predetermined time interval which has been set at step B02 has lapsed, the subsidiary system control unit SSC reverts to the step B02 and recycles the subroutine programs B02 to B08.

For the transmission of data from each of the subsidiary system control units SSC to the main system control unit MSC, the data which the microprocessor of the subsidiary system control unit SSC is about to transmit to the main system control unit MSC is first stored into the transmission data storage map STM-1, STM-2 or STM-3 in the memory of the transmitter control unit SSC. Then, the transmitter control unit SSC interrupts the operation currently in progress in the destination control unit MSC. The destination control unit MSC thus interrupted fetches data from the transmission data storage map MTM of the memory in the control unit MSC and transmits the responding data to the transmitter control unit SSC which now acts as a data receiver control unit. The data receiver control unit SSC in receipt of the data stores the data into its received data storage map SRM-1, SRM-2 or SRM-3.

In the presence of a request for interrupt from the main system control unit MSC to any of the subsidiary system control units SSC, there is generated an SSC interrupt. The "SSC" interrupt is generated on transmission of the request for interrupt from the data output port TD of the main system control unit MSC to the data input port RD of the subsidiary system control unit SSC through the serial data transmission line 28.

When there is a request for "SSC" interrupt, the control unit SSC brings an end to the operation currently in progress and executes an "SSC" interrupt routine program. The details of the "SSC" interrupt routine program will be hereinafter described with reference to FIG. 10.

Transmission Data Process Control Subroutine (A03)

Figure 7:
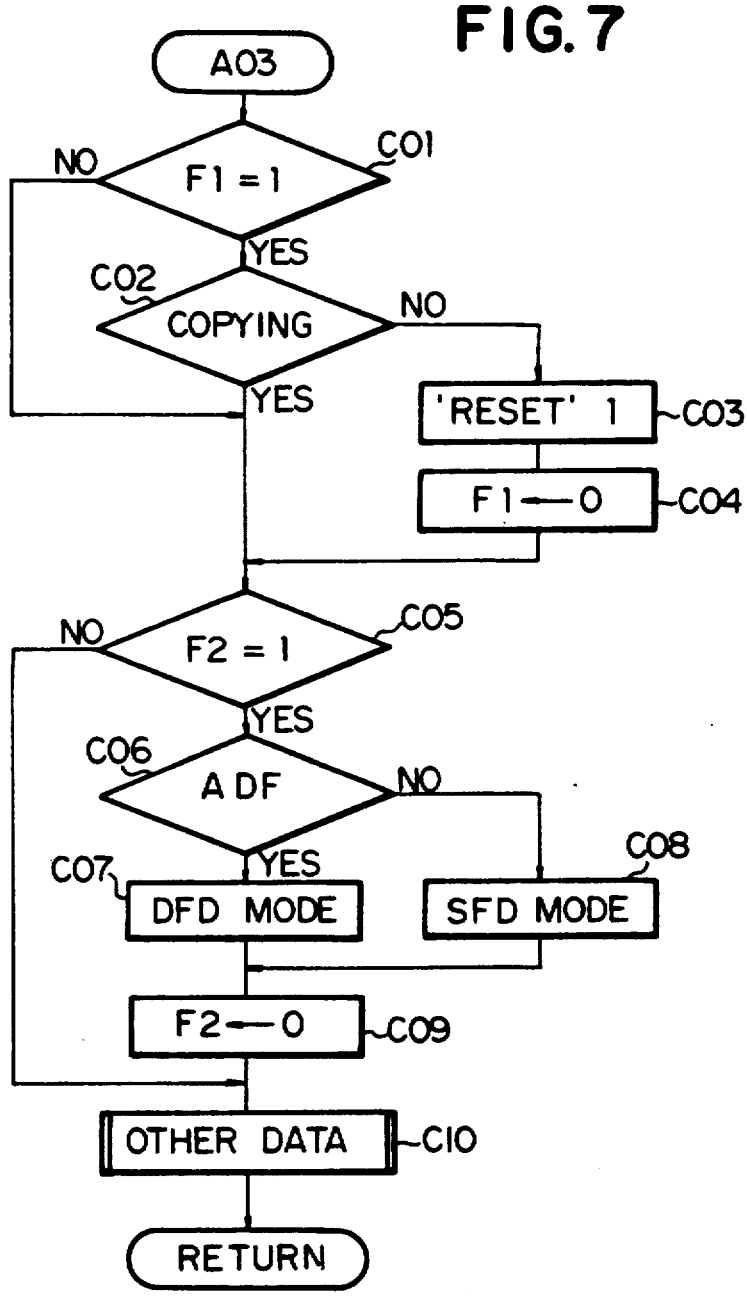
FIG. 7 is a flowchart showing the details of a transmission data process control subroutine program included in the main routine program illustrated in FIG. 5.

FIG. 7 is a flowchart showing the details of the transmission data process control subroutine program A03 included in the MSC main routine program illustrated in FIG. 5.

The transmission data process control subroutine program A03 herein shown starts with a decision step C01 at which the microprocessor of the main system control unit MSC checks if a flag "F1" is set at logic value "1". If it is found that the answer for the step C01 is given in the affirmative, the main system control unit MSC proceeds to step C02 to check if copying operation is currently in progress in the image forming apparatus. If it is found at this step C02 that copying operation is currently not in progress in the apparatus, the master system control unit MSC proceeds to step C03 to generate a reset command "RESET" to be transmitted to any of the subsidiary system control units SSC-1, SSC-2 and SSC-3 and store the reset command into the transmission data storage map MTM in the memory of the main system control unit MSC. Having thus stored the reset command "RESET" into the transmission data storage map MTM, the main system control unit MSC proceeds to step C04 to reset the flag "F1" to logic value "0".

Subsequently to step C04 or when it is found at step C01 that the flag "F1" is set at logic value "0" or at step C02 that copying operation is currently in progress in the apparatus, the main system control unit MSC proceeds to step C05 to check if a flag "F2" is set at logic value "1". If it is found that the answer for the step C05 is given in the affirmative, the main system control unit MSC proceeds to step C06 to detect whether or not a certain functional module such as the automatic document feed module 24 in particular is assembled in the apparatus currently in use.

If it is found at this step C06 that the automatic document feed module 24 in particular is assembled in the apparatus, the master system control unit MSC proceeds to step C07 to select any mode of operation such as the double-faced-document (DFD) copying mode of operation. During this DFD mode of operation, two single-side printed outputs are produced for each double-faced document sheet by the aid of the automatic document feed module 24 confirmed to be available in the apparatus. On the other hand, if it is found at step C06 that the automatic document feed module 24 by way of example is not assembled in the apparatus and thus the answer for the step C06 is given in the negative, the master system control unit MSC proceeds to step C08 to select, for example, the single-faced-document (SFD) copying mode of operation. During this SFD mode of operation, a single single-side printed output is produced for each single-faced document sheet with the automatic document feed module unavailable in the apparatus. Upon termination of the step C07 or step C08, the main system control unit MSC proceeds to step C09 to reset the flag "F2" to logic value "0". The series of steps C06, C07 and C09 or steps C06, C08 and C09 is omitted when the answer for step C05 is given in the negative.

Subsequently to step C09 or when it is found at step C05 that the flag "F2" is set at logic value "0", the main system control unit MSC proceeds to step C10 to process various other pieces of data which the main system control unit MSC may have for transmission to any of the subsidiary system control units SSC-1, SSC-2 and SSC-3. These pieces of data may be those enabling the first subsidiary system control unit SSC-1 to generate signals to activate the indicators and display sections on the control panel 20. Upon termination of the step C10, the main system control unit MSC reverts to the main routine program illustrated in FIG. 5 and executes the received data process control subroutine program A04.

Received Data Process Control Subroutine (A04)

Figure 8:
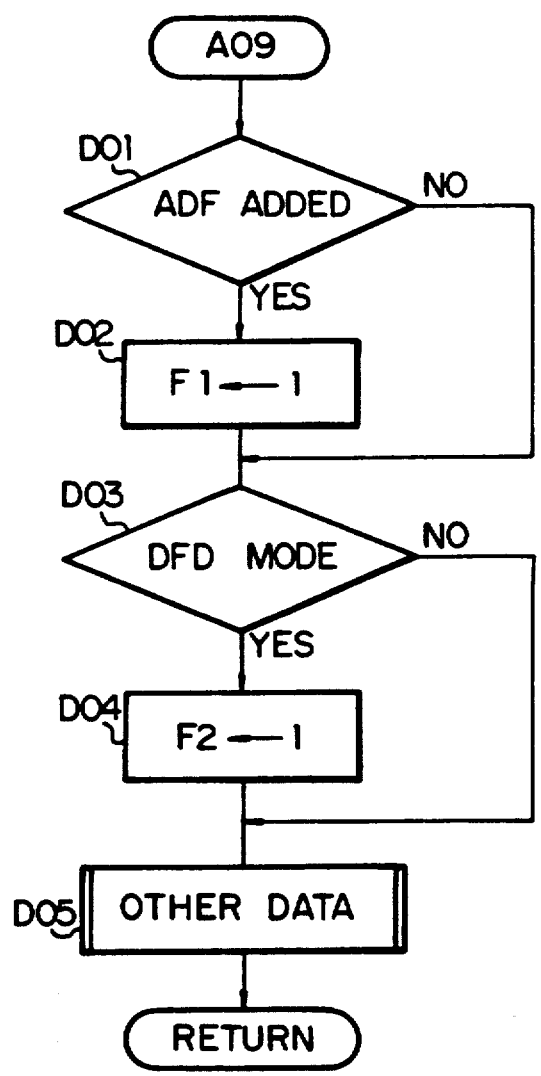
FIG. 8 is a flowchart showing the details of a received data process control subroutine program also included in the main routine program illustrated in FIG. 5.

FIG. 8 is a flowchart showing the details of the received data process control subroutine program A04 also included in the main routine program illustrated in FIG. 5.

The received data process control subroutine program A04 herein shown starts with a decision step D01 to check if the automatic document feed module 24 which has once been confirmed to be unavailable in the apparatus is now assembled to the apparatus. If it is found at this step D02 that the automatic document feed module 24 has been newly added to the apparatus and accordingly the answer for the step D01 is given in the affirmative, the main system control unit MSC proceeds to step D02 to set the flag "F1" to logic value "1".

Subsequently to this step D02 or when it is found at step D01 that the automatic document feed module 24 is not newly added to the apparatus, the main system control unit MSC proceeds to step D03 to check if there is present a signal of logic value "1" selecting the DFD mode. If it is found that the answer for the step D03 is given in the affirmative, the master system control unit MSC proceeds to step D04 to set the flag "F2" to logic value "1".

Subsequently to this step D04 or when it is found at step D03 that there is no signal of logic value "1" selecting the DFD mode, the master system control unit MSC proceeds to step D05 to process various other pieces of data which the main system control unit MSC may have received from any of the subsidiary system control units SSC-1, SSC-2 and SSC-3. These pieces of data may be those generated through manipulation of the keys on the control panel 20 and relayed from the first subsidiary system control unit SSC-1. Upon termination of the step D05, the main system control unit MSC reverts to the main routine program illustrated in FIG. 5 and executes the subroutine program A05.

"MSC" Interrupt Subroutine

Figure 9:
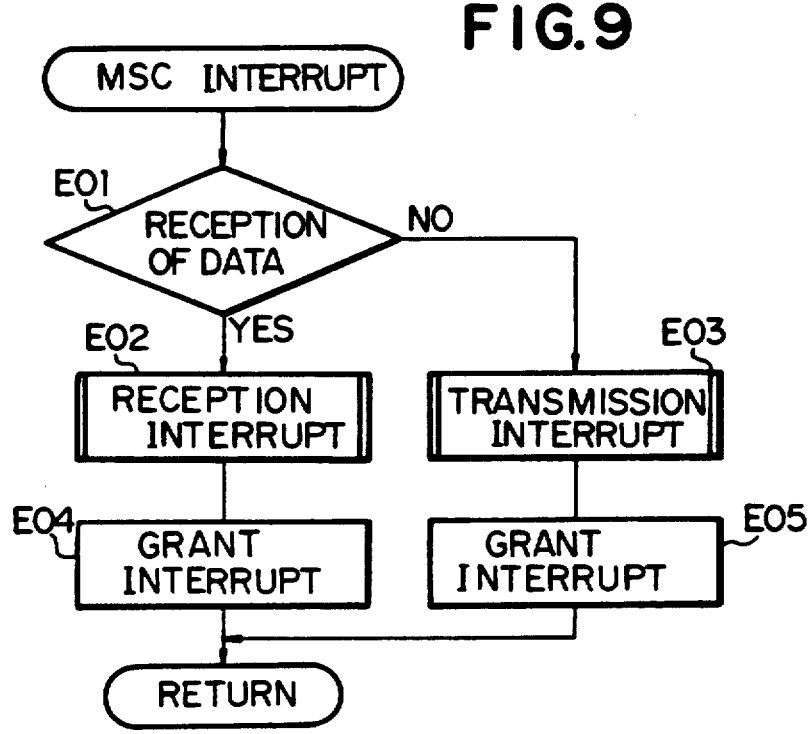
FIG. 9 is a flowchart showing the details of an interrupt subroutine program predominant over an interrupt of the main routine program illustrated in FIG. 5.

FIG. 9 is a flowchart showing the details of the "MSC" interrupt routine program of the MSC main routine program illustrated in FIG. 5. As previously noted, the "MSC" interrupt is generated in the presence of a request for interrupt from any of the subsidiary system control units SSC-1, SSC-2 and SSC-3 to the data input port RD of the main system control unit MSC through the serial data transmission line 28. When there is a request for "MSC" interrupt, the main system control unit MSC brings an end to the operation currently in progress and executes an "MSC" interrupt routine program.

As shown in FIG. 9, the "MSC" interrupt routine program starts with a step E01 at which the main system control unit MSC detects whether or not the interrupt currently requested is for the reception of data in the control unit MSC or the transmission of data from the control unit MSC. If it is determined at this step E01 that the interrupt currently requested is for the reception of data so that the answer for the step E01 is given in the affirmative, the main system control unit MSC proceeds to subroutine program E02 to execute a data reception interrupt procedure. On the other hand, if it is determined at step E01 that the interrupt currently requested is for the transmission of data from the main system control unit MSC, the main system control unit MSC proceeds to rr E03 to execute a data transmission interrupt procedure. The steps to be executed for these data reception and transmission interrupt procedure subroutine programs E02 and E03 are well known in the art and for this reason will not be herein described.

After the data reception interrupt procedure subroutine program E02 or the data transmission interrupt procedure subroutine program E03 has been executed, the main system control unit MSC proceeds to step E04 or step E05, respectively, and grants next interruption of the main routine program to receive data from any of the subsidiary system control units SSC-1, SSC-2 and SSC-3 or transmit data to the subsidiary system control unit SSC-1, SSC-2 or SSC-3. Upon termination of the step E04 or step E05, the main system control unit MSC reverts to the main routine program illustrated in FIG. 5 and continues execution of the subroutine program which has been interrupted.

"SSC" Interrupt Subroutine

Figure 10:
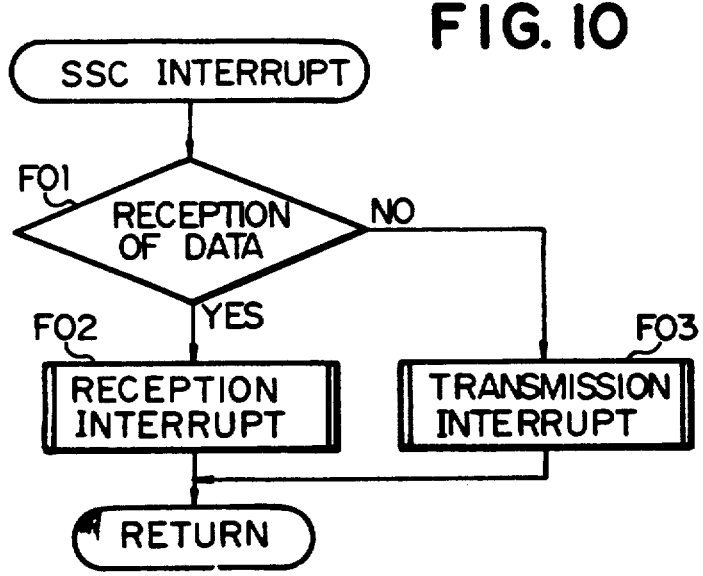
FIG. 10 is a flowchart showing the details of an interrupt subroutine program predominant over an interrupt of the main routine program illustrated in FIG. 6.

FIG. 10 is a flowchart showing the details of the "SSC" interrupt routine program of the SSC main routine program illustrated in FIG. 6. As previously noted, the "SSC" interrupt is generated in the presence of a request for interrupt from the main system control unit MSC to the data input port RD of the subsidiary system control unit SSC-1, SSC-2 or SSC-3 SSC through the serial data transmission line 28. When there is a request for "SSC" interrupt, the subsidiary system control unit SSC-1, SSC-2 or SSC-3 requested to interrupt its operation temporarily brings an end to the operation currently in progress and executes an "SSC" interrupt routine program.

As shown in FIG. 10, the "SSC" interrupt routine program starts with a step F01 at which any of the subsidiary system control units SSC-1, SSC-2 and SSC-3 detects whether or not the interrupt currently requested is for the reception of data in the control unit or the transmission of data from the control unit. If it is determined at this step F01 that the interrupt currently requested is for the reception of data so that the answer for the step F01 is given in the affirmative, the subsidiary system control unit SSC-1, SSC-2 or SSC-3 proceeds to subroutine program F02 to execute a data reception interrupt procedure. On the other hand, if it is determined at step F01 that the interrupt currently requested is for the transmission of data from the subsidiary system control unit SSC-1, SSC-2 or SSC-3, the subsidiary system control unit SSC-1, SSC-2 or SSC-3 proceeds to subroutine program F03 to execute a data transmission interrupt procedure. The steps to be executed for these data reception and transmission interrupt procedure subroutine programs F02 and F03 are also well known in the art and for this reason will not be herein described.

After the data reception interrupt procedure subroutine program F02 or the data transmission interrupt procedure subroutine program F03 has been executed, the subsidiary system control unit SSC-1, SSC-2 or SSC-3 reverts to the main routine program illustrated in FIG. 6 and continues execution of the subroutine program which has been interrupted.

Figure 11A:
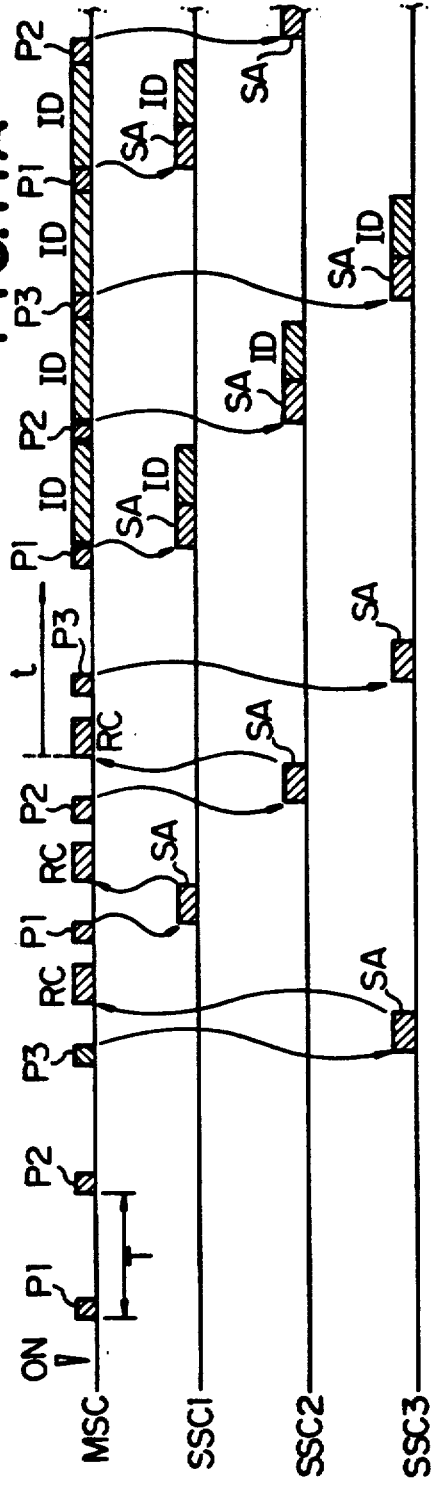

FIGS. 11A to 11D are timecharts showing the flows of data between the main system control unit MSC and each of the subsidiary system control units SSC-1, SSC-2 and SSC-3 in the data communication control system embodying the present invention. Indicated by P1, P2 and P3 are status information request commands to be transmitted from the main system control unit MSC to the individual subsidiary system control units SSC-1, SSC-2 and SSC-3, respectively, basically in preset cycles T (FIG. 11A). These status information request commands P1, P2 and P3, hereinafter referred to as polling commands, are included in the previously mentioned data transmission grant data which grants transmission of data from the subsidiary system control unit SSC-1, SSC-2 or SSC-3 to the main system control unit MSC. In response to such a polling command, each of the subsidiary system control units SSC-1, SSC-2 and SSC-3 transmits a status answer "SA" to the main system control unit MSC. The status answer "SA" thus transmitted from each of the subsidiary system control units SSC-1, SSC-2 and SSC-3 to the main system control unit MSC is not only indicative of the current status of the subsidiary system control unit SSC-1, SSC-2 or SSC-3. The status answer "SA" supplied from a particular subsidiary system control unit SSC-1, SSC-2 or SSC-3 is further effective to guarantee that the particular subsidiary system control unit is actually coupled to the main system control unit MSC and that the functional unit under the control of the particular subsidiary system control unit is validly assembled to the apparatus.

Indicated first in FIG. 11A are the flows of data exchanged between the main system control unit MSC and each of the subsidiary system control units SSC-1, SSC-2 and SSC-3 to initialize the memories of the main system control unit MSC and each of the subsidiary system control units SSC-1, SSC-2 and SSC-3 and to enable the main system control unit MSC to confirm that each of the subsidiary system control units SSC-1, SSC-2 and SSC-3 is in actuality coupled to the main system control unit MSC.

When the apparatus is switched in and each of the main and subsidiary system control units SSC-1, SSC-2 and SSC-3 is connected to power source, the main system control unit MSC initializes the content of the memory included therein and thereafter successively distributes polling commands P1, P2 and P3 to the subsidiary system control units SSC-1, SSC-2 and SSC-3, respectively. Each of the subsidiary system control units SSC-1, SSC-2 and SSC-3 in receipt of the polling commands P1, P2 and P3 sends a status answer "SA" back to the control unit MSC to inform the unit MSC that the particular subsidiary system control unit SSC-1, SSC-2 or SSC-3 is coupled to the main system control unit MSC. In the presence of the status answer "SA" thus received from each of the subsidiary system control units SSC-1, SSC-2 and SSC-3, the main system control unit MSC sends a reset command "RC" to each subsidiary system control unit SSC-1, SSC-2 or SSC-3 to promote the subsidiary system control unit to initialize the content of its memory.

Upon lapse of a predetermined time duration t after the reset command "RC" is sent out from the main system control unit MSC to each of the subsidiary system control units SSC-1, SSC-2 and SSC-3, the main system control unit MSC starts to output data ID indicative of the functions to be initially achieved in the system and the existing configuration of the system as a whole. In this instance, it may happen that any of the subsidiary system control units SSC-1, SSC-2 and SSC-3 receives data while the subsidiary system control unit is in the process of initializing the content of its memory. When this occurs, the data ID supplied to the particular subsidiary system control unit may be cleared during initialization of the memory. To avoid such an inconvenience, the predetermined time duration t1 upon lapse of which the data ID is to be output from the main system control unit MSC is preferably selected to be adequate for each of the subsidiary system control units SSC-1, SSC-2 and SSC-3 to complete its initializing operation before the subsidiary system control unit receives the data ID after the reset command "RC" is sent to the subsidiary system control unit. In the control system embodying the present invention, such a time duration is typically within a range of from several to tens of milliseconds.

Upon completion of the initializing operation, each of the subsidiary system control units SSC-1, SSC-2 and SSC-3 in receipt of the polling commands P1, P2 and P3 with the data ID sends a status answer "SA" to the main system control unit MSC together with data indicative of the functions to be initially achieved in the subsidiary system control unit and the existing configuration of the subsidiary system control unit. Transmission of such data is effected through execution of the data reception interrupt subroutine program E02 of the "MSC" interrupt routine program described with reference to FIG. 9 and the data transmission interrupt subroutine program F03 of the "SSC" interrupt routine program described with reference to FIG. 10.

Figure 11B:
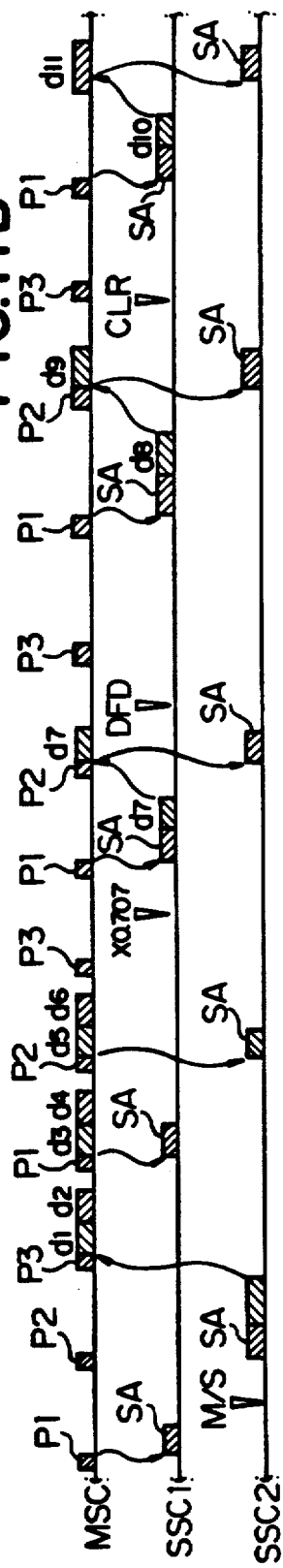

FIGS. 11B and 11C show the flows of data exchanged between the main system control unit MSC and each of the subsidiary system control units SSC-1, SSC-2 and SSC-3 until various modes and conditions of copying operation are to be selected after the main switch of the apparatus is turned on. The main switch is under the control of the subsidiary system control unit SSC-2 and is provided to dictate the supply of operating voltages (of, for example DC 24 volts and AC 100 volts) to be used in the apparatus except for the voltages on which the semiconductor microprocessors and peripheral devices incorporated in the control system are to operate.

When the main switch is turned on, the second subsidiary system control unit SSC-2 in control of the image reproducing module 22 sends to the main system control unit MSC report data (indicated at d1 in FIG. 11B) informing that the main switch is turned on as indicated by "M/S" in FIG. 11B. The main system control unit MSC in receipt of this report data d1 transmits to each of the subsidiary system control units SSC-1, SSC-2 and SSC-3 data (shown at d2 to d6 in FIG. 11B) indicating that "the standard mode of operation is selected", "the magnification/reduction ratio for duplication is one-to-one", "the quantity of printed outputs to be produced for each document sheet is one", "the print sheets to be used are of the standard A4 size" and so on.

Assume in this instance that the magnification/reduction ratio for duplication is thereafter selected at 1:0.707 by the operator manipulating the control panel 20, as indicated by "×0.707" in FIG. 11B. In this instance, report data (indicated at d7 in FIG. 11B) indicative of the particular magnification/reduction ratio is supplied to the main system control unit MSC from the first subsidiary system control unit SSC-1 in control of the control panel 20. The main system control unit MSC in receipt of the data d7 distributes the data to all the subsidiary system control units SSC-1, SSC-2 and SSC-3.

The operator may then select the DFD (double-faced document) mode of copying operation on the control panel 20 as indicated by "DFD" in FIG. 11B. In this instance, report data (indicated at d8 in FIG. 11B) indicative of the DFD mode of operation is supplied to the main system control unit MSC from the first subsidiary system control unit SSC-1. If the image forming apparatus under consideration is not equipped with the automatic document feed module 24 enabling such a mode of operation, the request for selecting the particular mode of operation is rejected by the main system control unit MSC so that the main system control unit MSC in receipt of the report data d8 distributes data (indicated at d9 in FIG. 11B) instructing the use of the SFD (single-faced document) mode of copying operation to all the subsidiary system control units SSC-1, SSC-2 and SSC-3.

It may then happen that the operator depress a "clear" key on the control panel 20 as indicated by "CLR" in FIG. 11B. When this occurs, the quantity of the printed outputs to be produced for each document sheet is selected at one. In this instance, report data (indicated at d10 in FIG. 11B) indicative of the quantity of the printed outputs thus selected is supplied to the main system control unit MSC from the first subsidiary system control unit SSC-1. The quantity of the printed outputs selected by the operator is equal to that which has already been selected during initialization of the subsidiary system control unit SSC-1 in control of the control panel 20. Report data (indicated at d11 in FIG. 11B) indicative of the quantity of printed outputs newly selected on the control panel 20 is however supplied to the main system control unit MSC from the first subsidiary system control unit SSC-1 in control of the control panel 20.

In these manners, the main system control unit MSC in receipt the various pieces of data from the individual subsidiary system control units SSC-1, SSC-2 and SSC-3 generates data pertinent for each piece of data and supplies the data to selected ones of the subsidiary system control units SSC-1, SSC-2 and SSC-3.

Thereafter, one of the print sheet supply cassettes (not shown) which have been loaded into the apparatus may be exchanged with another by the operator, as indicated at "N.C." in FIG. 11C. In this instance, pieces of report data (indicated at d12 in FIG. 11C) indicative of various parameters (the size and the quantity of remaining sheets in each cassette) relating to the print sheets available from the print sheet supply cassettes currently loaded in the apparatus and thus including the newly loaded cassette are supplied to the main system control unit MSC from the second subsidiary system control unit SSC-2. These pieces of report data are generated in the form of string data which consists of a series of data sections respectively indicating the various parameters. The main system control unit MSC in receipt of this string data to all the subsidiary system control units SSC-1, SSC-2 and SSC-3.

If a particular one of the print sheet cassettes or, in other words, a particular size of print sheets is selected from the control panel 20 as indicated at "C/S" in FIG. 11C, the first subsidiary system control unit SSC-1 in control of the control panel 20 transmits report data (indicated at d13 in FIG. 11C) indicative of the selected print sheet cassette or print sheet size to the main system control unit MSC when sending out a status answer "SA" in reply to the polling command P1 periodically distributed to the subsidiary system control unit SSC-1. The main system control unit MSC in receipt of the data d13 may then grant the selection of the print sheet cassette indicated by the data and, in this instance, distributes the data d13 to all the subsidiary system control units SSC-1, SSC-2 and SSC-3.

Through exchange of data as hereinbefore described, each of the subsidiary system control units SSC-1, SSC-2 and SSC-3 is enabled to select and establish various modes and conditions of copying operation on the basis of the information from the main system control unit MSC and will now be ready for starting a cycle of copying operation to produce the selected quantity of printed outputs for each document sheet. The copying operation is to be started when a print start key (not shown) provided on the control panel 20 is depressed by the operator.

FIG. 11D shows the flows of data exchanged between the main system control unit MSC and each of the subsidiary system control units SSC-1, SSC-2 and SSC-3 during a cycle of copying operation thus started with the print start key depressed by the operator.

When the print start key is thus depressed by the operator as indicated at "P/S" in FIG. 11D, report data (indicated at d14 in FIG. 11D) indicating that the print start key is depressed is submitted from the first subsidiary system control unit SSC-1 to the main system control unit MSC to inform that a cycle of copying operation is now to be started. When the main system control unit MSC receives this report data d14, the main system control unit MMSC supplies to the third subsidiary system control unit SSC-3 a document exchange command (indicated at d15 in FIG. 11D) effective to request the automatic document feed module 24 to set a document sheet in a predetermined position with respect to the image reproducing module 22. In response to this document exchange command d15, the third subsidiary system control unit SSC-3 in control of the automatic document feed module 24 supplies a document sheet to the predetermined position from a document supply tray (not shown) forming part of the module 24. When the operation to move the document sheet to the predetermined position is complete, the subsidiary system control unit SSC-3 sends to the main system control unit MSC report data (indicated at d16 in FIG. 11D) indicating the document sheet to be duplicated is now set in the predetermined position with respect to the image reproducing module 22.

The main system control unit MSC in receipt of the report data d16 transmits a print start command (indicated at d17 in FIG. 11D) to the second subsidiary system control unit SSC-2 to enable the control unit SSC-2 to start operation for the copying of the document sheet now in place. Where the automatic document feed module 24 is not assembled to the apparatus under consideration, the main system control unit MSC supplies the print start command d17 without preliminarily sending out the document exchange command d15.

In response to the print start command d17 thus supplied from the main system control unit MSC, the microprocessor of the second subsidiary system control unit SSC-2 starts execution of the programs to perform the required cycle of copying operation. Furthermore, the subsidiary system control unit SSC-2 generates print sheet supply report data (indicated at d18 in FIG. 11D) on the basis of a print sheet supply start signal output from the microprocessor and sends the data d18 to the main system control unit MSC. When a sequence of steps for operation to produce a single printed output executed completely, the subsidiary system control unit SSC-2 will receive a signal indicating that the optical scanning of the document sheet or the discharge of the printed output is terminated. On the basis of such a signal, the subsidiary system control unit SSC-2 produces an end-of-scan or end-of-discharge report data (indicated at d19 in FIG. 11D) and sends the data d19 to the main system control unit MSC.

If the quantity of the printed outputs to be produced is selected at one as has been assumed, the cycle of copying operation comes to an end with the transmission of the end-of-scan or end-of-discharge report data d19 to the main system control unit MSC. On the other hand, if the quantity of the printed outputs to be produced is selected at two or more, the print start command d17 is repeatedly supplied from the main system control unit MSC, which thus receives the print sheet supply report data d18 each time the print start command d17 is received from the subsidiary system control unit SSC-2 until the selected quantity of printed outputs is produced.

It will thus be finally determined by the main system control unit MSC that the end-of-scan or end-of-discharge report data d19 has been received a number of times corresponding to the number of times the print start command d17 has been sent out from the main system control unit MSC. When it is determined that the cycle of operation producing two or more printed outputs is complete, the main system control unit MSC sends a new document exchange command (indicated at d21 in FIG. 11D) to the third subsidiary system control unit SSC-3 so as to be ready to proceed to a subsequent sequence of steps.

It may be herein noted that data is exchanged between the main system control unit MSC and each of the subsidiary system control units SSC-1, SSC-2 and SSC-3 basically in the predetermined cycles T (FIG. 11A) in the polling mode of communication performed in the control system embodying the present invention. When string data having an exceptionally great data length is to be transmitted from or received by any of the control units, a polling command to be output from the main system control unit MSC is not output until the transmission or reception of the string data is terminated and is output from the main system control unit MSC after the string data is sent out or received completely, as will be seen from FIG. 11C.

FIGS. 12A and 12B are timecharts showing the flows of data exchanged between the main system control unit MSC and each of the subsidiary system control units SSC-1, SSC-2 and SSC-3 when one of the functional modules operable in the apparatus is not assembled to the apparatus immediately after the apparatus is initially switched in and is newly assembled to the apparatus after the apparatus has been switched in, while the other modules are equipped in the apparatus. In the description to follow, it will be assumed by way of example that the automatic document feed module 24 is not assembled to the apparatus and is later assembled to the apparatus equipped with the control panel 20 and image reproducing module 22. FIG. 12A shows the flows of the data exchanged when the automatic document feed module 24 is newly added to the apparatus while a cycle of copying operation is not in progress in the apparatus. FIG. 12B shows the flows of the data exchanged when the automatic document feed module 24 is newly added to the apparatus while a cycle of copying operation is in progress in the apparatus.

Assume now that the automatic document feed module 24 is newly added to the apparatus as indicated at "ADF" in FIG. 12A while a cycle of copying operation is not in progress. In this instance, the third subsidiary system control unit SSC-3 in control of the module 24 is connected to the main system control unit MSC and is thus activated to operate under the control of the main system control unit MSC. In response to the first polling command P3 supplied from the main system control unit MSC after the subsidiary system control unit SSC-3 is activated, the control unit SSC-3 sends a status answer "SA" to the main system control unit MSC to inform the control unit MSC that the subsidiary system control unit SSC-3 is now coupled to the control unit MSC. Accordingly, the main system control unit MSC in receipt of the status answer "A" transmits a reset command "RC" to each of the subsidiary system control units SSC-1, SSC-2 and SSC-3 to promote the subsidiary system control unit to initialize the content of its memory.

Upon lapse of a predetermined time duration t after the reset command "RC" is sent out from the main system control unit MSC to each of the subsidiary system control units SSC-1, SSC-2 and SSC-3, the main system control unit MSC starts to output data ID indicative of the functions to be initially achieved in the system and the exiting configuration of the system as a whole. When the initialization of the memory is complete in each subsidiary system control unit SSC-1, SSC-2 or SSC-3, each of the subsidiary system control units SSC-1, SSC-2 and SSC-3 in receipt of the polling commands P1, P2 and P3 from the main system control unit MSC sends a status answer "SA" to the main system control unit MSC together with data indicative of the functions to be initially achieved in the subsidiary system control unit and the existing configuration of the subsidiary system control unit.

Assume, on the other hand, the automatic document feed module 24 is newly added to the apparatus equipped with the control panel 20 and image reproducing module 22 as indicated at "ADF" in FIG. 12B while a cycle of copying operation is in progress in the apparatus. In this instance, the third subsidiary system control unit SSC-3 in control of the module 24 is connected to the main system control unit MSC and is thus activated to operate under the control of the main system control unit MSC. In response to the first polling command P3 supplied from the main system control unit MSC after the subsidiary system control unit SSC-3 is activated, the control unit SSC-3 sends a status answer "SA" to the main system control unit MSC to inform the control unit MSC that the subsidiary system control unit SSC-3 is now coupled to the control unit MSC. Until the cycle of copying operation currently in progress is terminated, the main system control unit MSC in receipt of the status answer "SA" from the subsidiary system control unit SSC-3 holds in abeyance the transmission of a reset command "RC" to each subsidiary system control unit SSC-1, SSC-2 or SSC-3.

When it is thereafter detected that the cycle of copying operation which has been in progress is complete, the main system control unit MSC issues a reset command "RC" to each of the subsidiary system control units SSC-1, SSC-2 and SSC-3 to promote the subsidiary system control unit to initialize the content of its memory. Upon lapse of the predetermined time duration t after the reset command "RC" is sent out from the main system control unit MSC to each of the subsidiary system control units SSC-1, SSC-2 and SSC-3, the main system control unit MSC starts to output data ID indicative of the functions to be initially achieved in the system and the existing configuration of the system as a whole. When the initialization of the memory is complete in each subsidiary system control unit SSC-1, SSC-2 or SSC-3, each of the subsidiary system control units SSC-1, SSC-2 and SSC-3 in receipt of the polling commands P1, P2 and P3 from the main system control unit MSC sends a status answer "SA" to the main system control unit MSC together with data indicative of the functions to be initially achieved in the subsidiary system control unit and the existing configuration of the subsidiary system control unit.

It may be noted that the flows of data indicated in FIGS. 11A to 11D and 12A and 12B are dictated by the "MSC" interrupt routine program described with reference to FIG. 9 when the data is to be directed from each subsidiary system control unit SSC-1, SSC-2 or SSC-3 to the main system control unit MSC and by the "SSC" interrupt routine program described with reference to FIG. 10 when the data is to be directed from the main system control unit MSC to each subsidiary system control unit SSC-1, SSC-2 or SSC-3.

While it has been assumed that the present invention has been applied to an electrophotographic image duplicating apparatus by way of example, advantages similar to those achieved by such an embodiment can be obtained when the present invention is embodied in a digital copier or a printer apparatus of any type.

What is claimed is:

1. A data communication control system for an image forming apparatus selectively equipped with at least two functional modules each having predetermined functions exclusively assigned to the modules, said data communication control system comprising:

a) a plurality of subsidiary control means, each of said subsidiary control means coupled to one of said functional modules for controlling said functional modules, and for generating and transmitting mode data designating any of said functions of said functional modules;

b) main control means for receiving said mode data, for determining whether execution of said designated function is allowable and for instructing each of said subsidiary control means to enable the equipped functional modules to execute either said designated function if said designated function is determined allowable or a designated function of a prior mode data if said designated function is determined not allowable; and c) coupling means for connecting said main control means and each of said subsidiary control means to allow full-duplex communication between said main control means and each of said subsidiary control means.

2. A data communication control system for an image forming apparatus selectively equipped with at least two functional modules each having predetermined functions exclusively assigned to the modules, said data communication control system comprising;
- a) a plurality of subsidiary control means each coupled to one of said functional modules, for transmitting data information, for controlling said functional modules and for storing in each of the plurality of subsidiary control means software programs, wherein said software programs are executed by said subsidiary control means to control the functions assigned to the functional module,
- b) main control means for communicating with each of said subsidiary control means to determine whether data information is being received from each subsidiary control means indicating that each of the functional modules is provided in said image forming apparatus and available, for terminating communication of data information with the subsidiary control means in control of the functional module determined unavailable, for polling said subsidiary control means in control of the functional module determined unavailable to determine if the functional module determined unavailable is present in the image forming apparatus, for reestablishing communication with the subsidiary control means in control of the functional module determined unavailable if said main control means determines that said functional module is added to said image forming apparatus and available, and for instructing each of said subsidiary control means to start the software programs stored therein, and
- c) coupling means for connecting said main control means and each of said subsidiary control means to allow full-duplex communication between said main control means and each of said subsidiary control means.

3. A data communication control system as set forth in claim 2, in which, when the functional module once determined to be unavailable by said main control means is added to said image forming apparatus, the main control means informs each of said plurality of subsidiary control means that the particular functional module is now available in said apparatus.

4. A data communication control system for an image forming apparatus selectively equipped with at least two functional modules each having predetermined functions exclusively assigned to the modules, said data communication control system comprising:
- a) a plurality of subsidiary control means each coupled to one of said functional modules, for transmitting data information, for controlling said functional modules and for storing in each of the plurality of subsidiary control means software programs, wherein said software programs are executed by said subsidiary control means to control the functions assigned to the functional module under the control of the subsidiary control means,
- b) main control means for communicating with each of said subsidiary control means, for receiving data information from each subsidiary control means to determine whether data information is being received from each subsidiary control means indicating that each of the functional modules is present in said image forming apparatus and available, for terminating communication with the subsidiary control means in control of the functional module determined unavailable, for polling said subsidiary control means in control of the functional module determined unavailable to determine if the functional module determined unavailable is present in the image forming apparatus, for reestablishing communication with the subsidiary control means in control of the functional module determined unavailable if said main control means determines that said functional module is added to said image forming apparatus while any cycle is in progress in said image forming apparatus and available upon completion of said cycle of operation, and for instructing each of said subsidiary control means to start the software programs stored therein, and
- c) coupling means for connecting said main control means and each of said subsidiary control means to allow full duplex communication between said main control means and each of said subsidiary control means.

5. A data communication control system as set forth in claim 4, in which, when the functional module once determined to be unavailable by said main control means is added to said image forming apparatus, the main control means informs each of said plurality of subsidiary control means that the particular functional module is now available in said apparatus.

6. A data communication control system for an image forming apparatus selectively equipped with at least two functional modules each having predetermined functions exclusively assigned to the modules, said data communication control system comprising:
- a plurality of subsidiary control means each coupled to one of said functional modules for controlling said functional modules, and for transmitting data information and each of the plurality of subsidiary control means having therein memory which stores information corresponding to conditions of each of the functional modules,
- main control means, including a main memory for storing information corresponding to conditions of each of the functional modules, for communicating with each of said subsidiary control means, for receiving data information from each subsidiary control means, for determining, while said image forming apparatus is being powered on, whether data information is being received from one of the subsidiary control means indicating that a functional module previously unavailable is added to the image forming apparatus and available, and if said functional module is determined available for updating the contents of the main memory with the data information received and instructing each of said plurality of subsidiary control means to reset, and
- coupling means for connecting said main control means and each of said subsidiary control means to allow full-duplex communication between said main control means and each of said subsidiary control means.

7. A data communication control system for an image forming apparatus selectively equipped with at least two functional modules each having predetermined functions exclusively assigned to the modules and which executes functional operations in cooperation with equipped functional modules, said data communication control system comprising:
- a plurality of subsidiary control means each having a memory and each coupled to one of said functional modules for controlling said functional modules, and for storing mode data in the memory and transmitting said mode data designating any of the functional operations, main control means, having a main memory, for communicating with each of said subsidiary control system to enable the equipped functional modules to execute the functional operation, for receiving said mode data and storing said mode data in said main memory, for determining whether execution of the designated functional operation is allowable, and for transmitting to the subsidiary control means either new mode data if said designated functional operation is allowable or prior mode data stored in said main memory if said designated function is not allowable, and coupling means for connecting said main control means and each of said subsidiary control means to allow full-duplex communication between said main control means and each of said subsidiary control means.

* * * * *